United States Patent [19]

Rajsigl

[11] 4,021,086
[45] May 3, 1977

[54] ANTIFRICTION BEARING ARRANGEMENT FOR A HIGH SPEED ROTARY MACHINE PART

[75] Inventor: Zdenek Rajsigl, Brno, Czechoslovakia

[73] Assignee: ZVL Vyzkumny ustav pro valiva loziska, Brno, Czechoslovakia

[22] Filed: Aug. 18, 1975

[21] Appl. No.: 605,430

[52] U.S. Cl. .............................. 308/189 R; 74/572; 310/261; 308/DIG. 15; 308/187.1

[51] Int. Cl.² .................. F16C 13/00; F16C 33/00; F16C 35/00

[58] Field of Search .............. 308/187.1, 187, 194, 308/188, 189 R, 195, DIG. 15; 310/261; 74/572

[56] References Cited

UNITED STATES PATENTS 3,477,772  11/1969  Anderson et al. ................. 308/194
3,858,950  1/1975  Otto .............................. 308/187.1

*Primary Examiner*—Robert R. Song
*Assistant Examiner*—Richard A. Bertsch

[57] ABSTRACT

Antifriction bearing arrangement for a rotary machine part, especially of the rotor part of an electric motor having its outer winding fastened within the bearing housing, with a shaft mounted in a pair of antifriction bearings whose outer rings are located near the face of the rotary machine part. Said outer rings comprise outer raceways for rolling elements, while the inner raceway is formed directly on the surface of the shaft, the rotary machine part forming with the antifriction bearings an assembly unit whose diameter is less than or at most equal to the diameter of the outer rings of the antifriction bearings, the internal capacity of the bearings corresponding to the amount of grease which is sufficient to maintain lubrication of the bearings over their entire life.

13 Claims, 3 Drawing Figures

ANTIFRICTION BEARING ARRANGEMENT FOR A HIGH SPEED ROTARY MACHINE PART

The invention relates to a roller bearing arrangement for a rotary machine part, especially for the rotor part of a high-speed electric motor with high-frequency drive, which is practically designed for textile machines based on the Open-End spinning method, or for other purposes.

With textile machines belt-driven spindles are commonly used. The spindle is composed of a shaft supported by two sealed roller bearings, each containing a permanent grease filling. On one free and overhanging end of the shaft there is located the particular working member; on the opposite side there is disposed the pulley which usually is held down against the belt and thus caused to rotate. Open-End spinning machines equipped with said spindles operate at approximately 40,000 rpm. Machines now under development operate at higher speeds; with an increasing number of spinning chambers rotated by means of belt drives, serious technical problems arise. With increasing speeds, the respective forces on the shaft created by the spinning chambers and the bearings are increased, and hence the thrust forces acting upon the bearing by the pull of the belt on the one hand, and the dynamic forces on the other increase. Their effects are unfavorably manifested in the performance of the high-speed bearings, resulting in their decreased life expectancy and reliability. Generally speaking, increased peripheral speeds will result in decreased reliability of the whole belt drive as well as in greater noise of the textile machine. These drawbacks may influence in an unfavorable way the entire textile machine, and thus the entire economy of the new Open-End spinning technology.

The roller bearing arrangement according to the invention considerably mitigates the shortcomings cited above in prior art constructions. In accordance with the invention an electric motor has an outer winding fastened within the bearing housing, the shaft of the motor, which bears the armature or rotor thereof, being mounted in two roller bearings the outer races of which are located near the opposite ends of the rotor, the inner raceways of the roller bearings being formed directly on the surface of the shaft. In accordance with the invention, the diameter of the rotary machine part, which forms an assembly unit with the roller bearings, is less than or at most equal to the outer diameter of the outer raceways of the roller bearings. The internal capacity, that is, the space within the bearings, corresponds to the amount of grease which is sufficient to maintain lubrication of the bearings over their entire operational life. The outer races of the roller bearings are provided on at least one side of the lubricant with recesses for reception of the lubricant. Between the face of the outer raceway or the shield thereof and the face of the rotary machine part there is provided a labyrinth seal formed by a rib on the outer face of the raceway or the shield and by a cylindrical part on the face of the rotary machine part.

The outer raceway of at least one of the roller bearings is provided on its external circumference with at least one profiled groove for the reception of cement for cementing such raceway within its seat in the housing. Within such seat there is provided at least one profiled groove for the reception of cement for cementing the outer raceway within such seat. One of the outer raceways is mounted within the respective seat in the housing with an axial push fit, and between this outer raceway and the cap fixed within the housing there is disposed a compression spring. The cap is provided with a labyrinth seal adjacent the cylindrical surface of the shaft.

The space between the cap and the roller bearing is provided with at least one duct which opens to the outer surface of the cap or housing. The space within the roller bearing at the remote end of the rotary machine part is sealed by means of a labyrinth seal located between the shaft and the respective bearing-receiving seat in the housing. The space between the roller bearing and the labyrinth seal located between the shaft and the seat in the housing is provided with at least one duct opening to the outer surface of the housing. The outer rings or shields of the roller bearings are provided with orifices serving for the re-lubrication of said roller bearings. The outer raceways of the roller bearings are at least partially located within the heads or ends of the outer winding of the electric motor.

The arrangement in accordance with the present invention insures good performance of the high-speed bearings, thus attaining a high functional reliability thereof. Within the drive section of the motor assembly there are no further rotary components, the encased design permitting an excellent solution of the entire bearing arrangement; such design also permits the attainment of a lower noise level of the textile machine by providing for the damping and insulation of noise in an easy and more effective manner. The elimination of the usual noisy belt drive also contributes to the reduction of the noise of the device. The arrangement of the invention restricts to a large degree the pressure gradients that are generated within the spinning chamber and also on the opposite sides of the bearings, their lubrication being solved in such a way that the working surfaces are reliably lubricated and that the lubricant cannot enter the spinning mechanism proper. Furthermore, requirements are met with respect to a limited length of the electric motor, which contributes to a high dynamic rigidity of the rotor. The arrangement is relatively simple from the point of view of design and technological aspects, thus permitting the perfect balancing of the rotor and permitting its simple removal and exchange directly within the respective textile plant.

An example of the electric motor rotor part bearing arrangement according to the invention is illustrated in the drawings, wherein.

Figure 1:
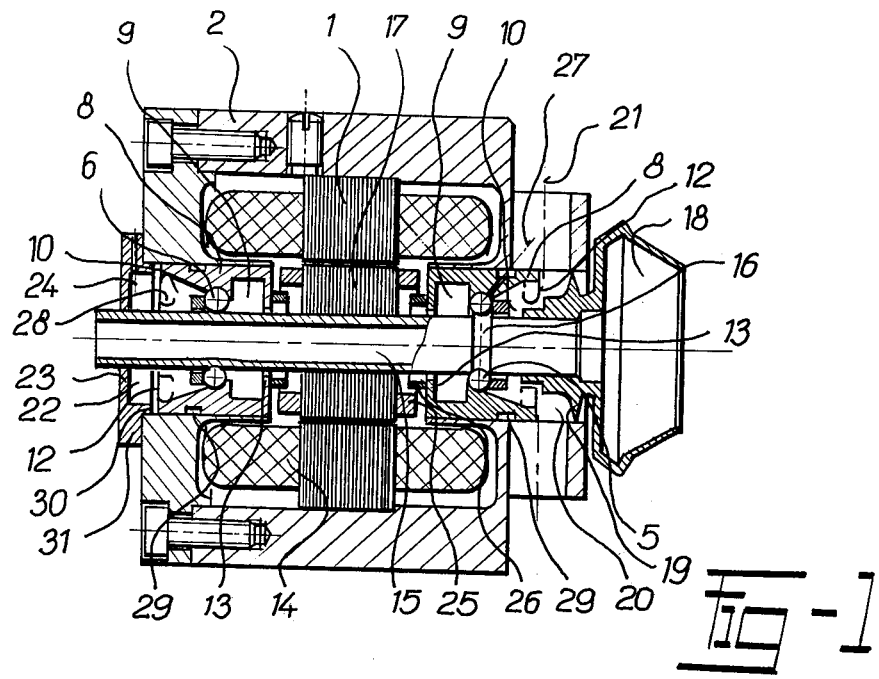
FIG. 1 is a view in vertical axial cross-section through the general arrangement.
Figure 2:
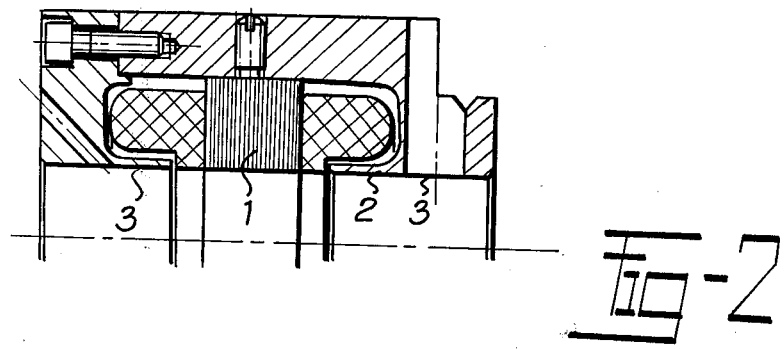
FIG. 2 is a detail on an enlarged scale of the housing assembly unit with parts of the outer winding of the motor.
Figure 3:
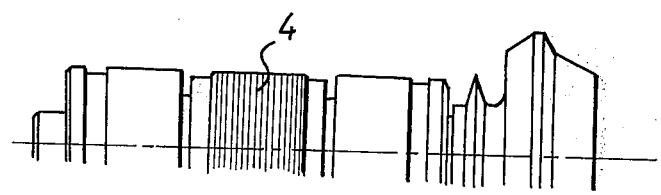
FIG. 3 is a fragmentary view in side elevation of an integral assembly including the rotor part of the motor, the roller bearings, and the working element of an Open-End spinning machine.

The main parts of the electric motor are represented by two basic components, i.e. by the housing 2 comprising the outer winding 1 and by the integral assembly unit of the rotor part generally designated 4 (FIG. 3) which can be simply built in into the housing 2, exchanged and independently balanced. The rotor part 4 according to the detail shown in FIG. 2 consists of a pair of roller bearings 5 and 6, between which, on a shaft 15, here shown as a hollow, comprising inner raceways 16 of the roller bearings 5, 6, the laminated rotor 17 of the electric motor is mounted. On one or on both overhanging ends of the shaft, a spinning chamber or another working element 18 is located. The rotor part 4 is fixed on one or both cylindrical surfaces 3 of the housing 2 in outer rings 8. The fixed location may be accomplished by cementing. To enhance the effectiveness of the cementing process, differently shaped grooves 29 may be located on the surface of the outer ring 8 or on the cylindrical surface 3 or on both mentioned surfaces. In the case that one of the outer rings will be mounted with a pressure fit, it will be axially held down by means of the spring 30 leaning against the cap 31. For the elimination of pressure gradients generated within the space of the spinning chamber 18 a labyrinth seal 19 may be provided. The space 20 between the labyrinth seal 19 and the face of the bearing 5 is interconnected with the surface of the housing 2, i.e., with the external atmosphere, through one or several ducts 21. The construction at the opposite bearing 6 is similar, the space 22 between the labyrinth seal 23 and the outer ring face of said bearing 6 being interconnected with the surface of the housing 2 through one or more ducts 24.

The roller bearings 5, 6 have light-weight separators made of plastic or wound textile material. Unlike standardized bearings with the same mean diameter value, the rings 8 of bearings 5, 6 are wider and have a greater inner diameter with comparatively roomy, differently-shaped recesses 9, 10 arranged on one side or on both sides of the outer raceway. Each bearing may be unilaterally or bilaterally protected by means of shields 12, 13. The internal shields 13 may form with the outer rings an integral part and at the same time may form the labyrinth seal 26, which protrudes into the rib 25 of the rotor 17 of the electric motor, protecting the bearing from access by impurities. To reduce the length of the electric motor and to achieve a high dynamic stiffness, the outer rings of bearings 5, 6 are located inside of the heads 14 of the outer winding 1. The lubrication may be provided by permanent grease-fillings placed inside of the outer rings 8. In service, the bearings may be re-lubricated with a further charge of grease, which may be effected by means of orifices 27, provided directly either on the outer ring near the raceway, or the orifices 28 are located within the shields 13.

Although the invention is illustrated and described with reference to a single preferred embodiment thereof, it is to be expressly understood that it is in no way limited by the disclosure of such a preferred embodiment, but is capable of numerous modifications within the scope of the appended claims.

What is claimed is:

1. In an antifriction bearing arrangement for a rotor, comprising a housing defining a hollow cylindrical space therein, a shaft extending coaxially through the cylindrical space, an outer winding centrally disposed within and fastened to the housing, a rotor supported centrally on the shaft in alignment with the outer winding, a pair of antifriction bearings disposed around the shaft and individually positioned adjacent opposite axial ends of the rotor, each bearing having an outer ring comprising an outer raceway, a pair of inner raceways individually defined on the shaft surface underlying the respective bearings, the outer diameter of the outer rings of the bearings being at least as large as the outer diameter of the rotor, the internal capacity of the bearings corresponding to the amount of grease which is sufficient to maintain bearing lubrication over their entire life.

2. Antifriction bearing arrangement according to claim 1, wherein the outer rings of the anti-friction bearings are provided with recesses for the lubricant on at least one side of the raceway.

3. Antifriction bearing arrangement according to claim 1, wherein between the face of the outer ring or the shield of this outer ring and the face of the rotary machine part, there is provided a labyrinth seal, formed by a rib on the face of one of the outer rings or of the shield, and the cylindrical part on the face of the rotary machine part.

4. Antifriction bearing arrangement according to claim 1, wherein at least one outer ring of the anti-friction bearings is provided on its external circumference with at least one profiled groove for the deposition of cement for cementing this outer ring within the ring receiving seat of the housing.

5. Antifriction bearing arrangement according to claim 1, wherein within the seat of the housing there is provided at least one profiled groove for the deposition of cement for cementing this outer ring of the roller bearings within this seat.

6. Antifriction bearing arrangement according to claim 5, wherein the cap is provided with a labyrinth seal adjacent the cylindrical surface of the shaft.

7. Antifriction bearing arrangement according to claim 5, wherein the space between the cap and the anti-friction bearing is provided with at least one duct opening to the outer surface of the cap or the housing.

8. Antifriction bearing arrangement according to claim 1, wherein one of the outer rings is mounted within the seat of the housing with axial force-fit and between this outer ring and a cap fixed within the housing there is placed a compression spring.

9. Antifriction bearing arrangement according to claim 1, wherein the space of the anti-friction bearing on the remote end of the rotary machine part is sealed by means of the labyrinth seal located between the shaft and the seat of the housing.

10. Antifriction bearing arrangement according to claim 9, wherein the space between the anti-friction bearing and the labyrinth seal located between the shaft and the seat of the housing is provided with at least one duct opening to the outer surface of the housing.

11. Antifriction bearing arrangement according to claim 1, wherein in the outer rings of the anti-friction bearings there are formed orifices serving for the relubrication of the roller bearings.

12. Antifriction bearing arrangement according to claim 1, wherein in the shields of the anti-friction bearings there are formed orifices serving for the relubrication of the roller bearings.

13. Antifriction bearing arrangement of an electric motor rotor part according to claim 1, wherein the outer rings of the anti-friction bearings are at least partially located within the heads of the outer winding of the electric motor.

* * * * *